United States Patent
Norman

(10) Patent No.: US 11,666,994 B2
(45) Date of Patent: *Jun. 6, 2023

(54) INTEGRATED HORN STRUCTURES FOR HEAT EXCHANGER HEADERS

(71) Applicant: Hamilton Sundstrand Corporation, Charlotte, NC (US)

(72) Inventor: Joshua M. Norman, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,753

(22) Filed: Jul. 25, 2022

(65) Prior Publication Data

US 2022/0371134 A1 Nov. 24, 2022

Related U.S. Application Data

(63) Continuation of application No. 16/690,975, filed on Nov. 21, 2019, now Pat. No. 11,396,069.

(51) Int. Cl.
*B23P 15/26* (2006.01)
*F28F 7/02* (2006.01)
(Continued)

(52) U.S. Cl.
CPC ............. *B23P 15/26* (2013.01); *F28F 7/02* (2013.01); *B22F 10/00* (2021.01); *B33Y 10/00* (2014.12);
(Continued)

(58) Field of Classification Search
CPC ... F28F 9/0275; F28F 2210/02; F28D 1/0308; F28D 3/12; B23P 15/26; B33Y 10/00; B33Y 30/00; B33Y 50/00; B33Y 50/02
See application file for complete search history.

(56) References Cited

U.S. PATENT DOCUMENTS

| 2,471,960 A | * | 5/1949 | Johnson | ............... F25B 39/04 165/169 |
| 6,675,881 B1 | * | 1/2004 | Rago | .................. F28D 7/106 165/181 |

(Continued)

FOREIGN PATENT DOCUMENTS

| WO | 2018233866 A1 | 12/2018 |
| WO | WO-2018233866 A1 * | 12/2018 |

OTHER PUBLICATIONS

Extended European Search Report for European Patent Application No. 20193812.3, dated Jan. 13, 2021, 7 pages.

*Primary Examiner* — Jianying C Atkisson
*Assistant Examiner* — For K Ling
(74) *Attorney, Agent, or Firm* — Kinney & Lange, P.A.

(57) ABSTRACT

A heat exchanger header includes a primary fluid duct extending between a fluid port and a first branched region, a plurality of secondary fluid ducts fluidly connected to the primary fluid duct at the first branched region, wherein an overhang region is formed laterally between adjacent ones of the plurality of secondary fluid ducts, and wherein each of the plurality of secondary fluid ducts extends between the first branched region and a second branched region, a plurality of tertiary fluid ducts fluidly connected to each of the plurality of secondary fluid ducts at the second branched regions, a primary horn integrally formed with and extending from the overhang region, an at least one secondary horn integrally formed with and extending from one of the plurality of tertiary fluid ducts, and a sacrificial support structure extending between the primary horn and the at least one secondary horn.

20 Claims, 3 Drawing Sheets

(51) Int. Cl.
  *B33Y 10/00*   (2015.01)
  *B33Y 80/00*   (2015.01)
  *B22F 10/00*   (2021.01)
  *F28D 21/00*   (2006.01)
  *F28F 9/02*    (2006.01)

(52) U.S. Cl.
  CPC ....... *B33Y 80/00* (2014.12); *F28D 2021/0021* (2013.01); *F28F 9/02* (2013.01); *F28F 2255/18* (2013.01)

(56) References Cited

U.S. PATENT DOCUMENTS

| | | | |
|---|---|---|---|
| 6,840,314 B2 * | 1/2005 | Rivis | F28F 3/02 |
| | | | 165/170 |
| 7,665,956 B2 * | 2/2010 | Mitchell | F01D 5/182 |
| | | | 415/115 |
| 10,315,252 B2 | 6/2019 | Symeonidis et al. | |
| 10,323,887 B2 | 6/2019 | Fennessy | |
| 2012/0074051 A1 | 3/2012 | Gebauer et al. | |
| 2013/0206374 A1 * | 8/2013 | Roisin | F28D 7/0041 |
| | | | 165/165 |
| 2015/0151493 A1 * | 6/2015 | Schmidt | B29C 64/40 |
| | | | 700/98 |
| 2016/0107393 A1 * | 4/2016 | Hartmann | B22F 10/80 |
| | | | 700/98 |
| 2017/0089643 A1 | 3/2017 | Arafat | |
| 2017/0248372 A1 | 8/2017 | Erno et al. | |
| 2018/0238627 A1 | 8/2018 | Herring et al. | |
| 2018/0259270 A1 * | 9/2018 | Dixon | B33Y 80/00 |
| 2019/0086154 A1 | 3/2019 | Adriany et al. | |
| 2019/0137974 A1 * | 5/2019 | Wever | G06F 30/23 |

* cited by examiner

INTEGRATED HORN STRUCTURES FOR HEAT EXCHANGER HEADERS

REFERENCE TO RELATED APPLICATION

This application is a continuation of U.S. patent application Ser. No. 16/690,975, filed Nov. 21, 2019, entitled "INTEGRATED HORN STRUCTURES FOR HEAT EXCHANGER HEADERS" by Joshua M. Norman.

BACKGROUND

This disclosure relates generally to heat exchangers, and more specifically to support structures for heat exchanger headers.

Heat exchangers are well known in many industries for providing compact, low-weight, and highly-effective means of exchanging heat from a hot fluid to a cold fluid. Heat exchangers can operate in high temperature environments, such as in modern aircraft engines. Heat exchangers that operate at elevated temperatures can have reduced service lives due to high thermal stress. Thermal stresses can be caused by uneven temperature distribution within the heat exchanger or with abutting components, component stiffness and geometry discontinuity, and/or other material properties of the heat exchanger. The interface between inlet or outlet headers and the core of a heat exchanger can be subject to the highest thermal stress and shortest service life.

Additive manufacturing techniques can be utilized to manufacture heat exchangers layer by layer to obtain a variety of complex geometries. Depending on the geometry of the heat exchanger, additional internal or external support structures can be necessary during additive manufacturing to reinforce a build or to facilitate the manufacturing process (e.g., act as heat sinks to stabilize the melt pool of a weld). Often, removal of internal support structures from a heat exchanger is difficult or even impossible, thereby limiting the geometries that can be built successfully. Furthermore, support structures can be sources of increased thermal stress when the support structures remain intact during operation of the heat exchanger.

SUMMARY

In one example, a heat exchanger header includes a primary fluid duct extending between a fluid port and a first branched region, a plurality of secondary fluid ducts fluidly connected to the primary fluid duct at the first branched region, wherein the plurality of secondary fluid ducts extends from the first branched region such that an overhang region is formed laterally between adjacent ones of the plurality of secondary fluid ducts, and wherein each of the plurality of secondary fluid ducts extends between the first branched region and a second branched region, a plurality of tertiary fluid ducts fluidly connected to each of the plurality of secondary fluid ducts at the second branched regions, a primary horn integrally formed with and extending from the overhang region, an at least one secondary horn integrally formed with and extending from one of the plurality of tertiary fluid ducts, and a sacrificial support structure extending between the primary horn and the at least one secondary horn.

In another example, a heat exchanger includes a first header, a second header, and a core extending between the first header and the second header such that the first header, the second header, and the core are fluidly connected. The second header includes a primary fluid duct extending between a fluid port and a first branched region, a plurality of secondary fluid ducts fluidly connected to the primary fluid duct at the first branched region, wherein the plurality of secondary fluid ducts extends from the first branched region such that an overhang region is formed laterally between adjacent ones of the plurality of secondary fluid ducts, and wherein each of the plurality of secondary fluid ducts extends between the first branched region and a second branched region, a plurality of tertiary fluid ducts fluidly connected to each of the plurality of secondary fluid ducts at the second branched regions, a primary horn integrally formed with and extending from the overhang region, an at least one secondary horn integrally formed with and extending from one of the plurality of tertiary fluid ducts, and a sacrificial support structure extending between the primary horn and the at least one secondary horn.

DETAILED DESCRIPTION

A heat exchanger with integrated horns and a sacrificial support structure is disclosed herein. The combination of the integrated horns and the sacrificial support structure enables the heat exchanger not only to be additively manufactured in the nearly vertical orientation that is required due to other manufacturing constraints, but also to meet operational performance requirements without damaging the part by inducing thermal stresses in the supported regions. In general, the heat exchanger is formed of a system of fluid ducts. (The term "duct" as used herein refers to a walled structure enclosing a channel or passageway for fluid flow.) The heat exchanger is described below with reference to FIGS. 1-3.

Figure 1:
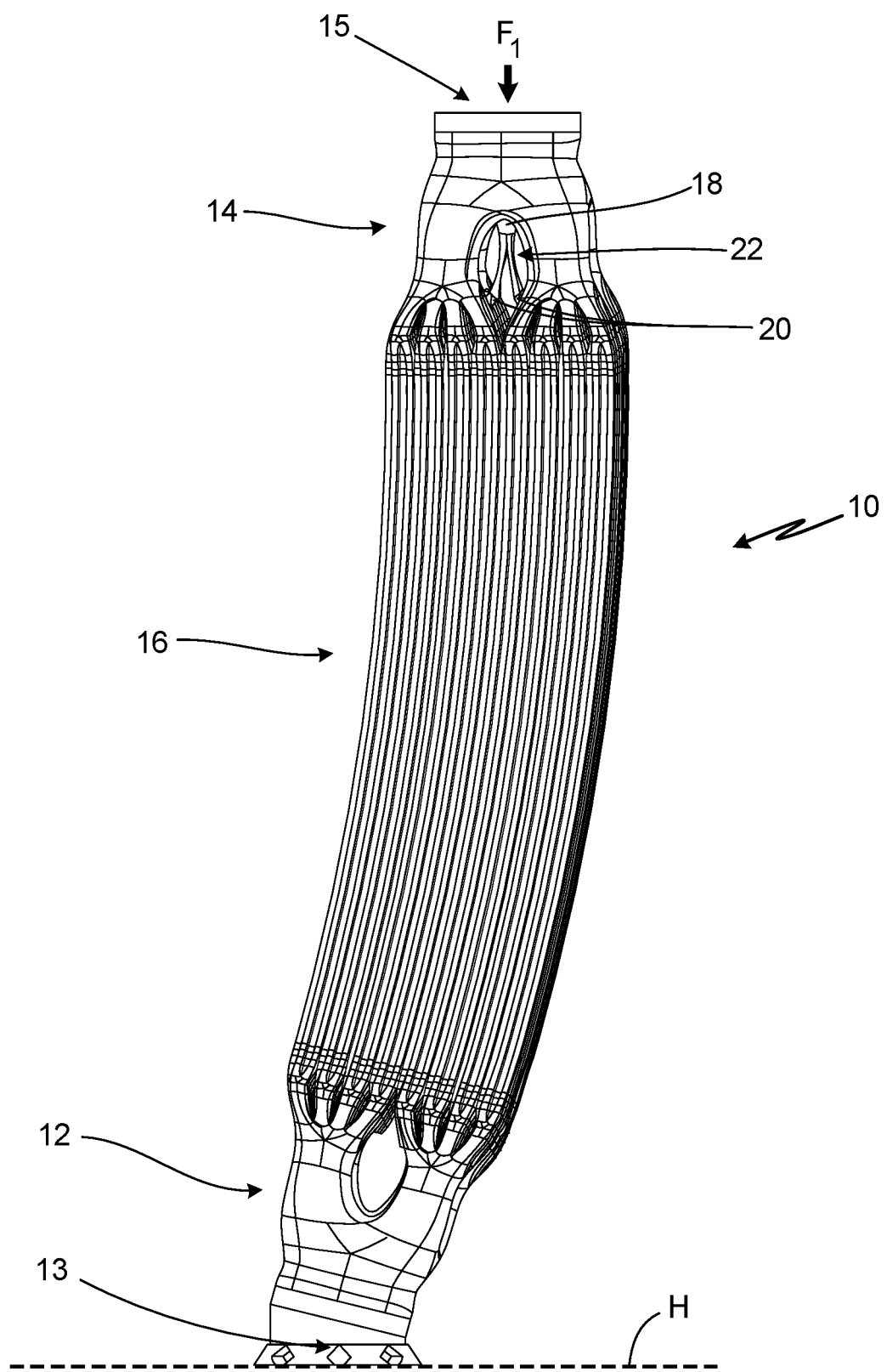
FIG. 1 is a side view of a heat exchanger in a vertical orientation showing a first header, a second header, and a core.

FIG. 1 is a side view of heat exchanger 10 in a vertical orientation. Heat exchanger 10 includes first header 12 with first fluid port 13, second header 14 with second fluid port 15, and core 16. Second header 14 includes primary horn 18, secondary horns 20, and sacrificial support structure 22. Heat exchanger 10 interacts with first fluid $F_1$ and a second fluid (not shown).

First fluid port 13 forms an opening into the fluid system of heat exchanger 10. Specifically, first fluid port 13 opens into first header 12. First header 12 is fluidly connected to core 16 distal to first fluid port 13. Second fluid port 15 forms an additional opening into the fluid system of heat exchanger 10 opposite first fluid port 13. Second fluid port 15 opens into second header 14. Second header 14 is fluidly connected to core 16 distal to second fluid port 15. First header 12 and second header 14 can have substantially similar branching structures or other overall geometries.

Core 16 is disposed between first header 12 and second header 14. As shown in FIG. 1, the three-dimensional structure of core 16 can be slightly curved, but it should be understood that alternative embodiments can include other core types and/or geometries, including larger or shallower curved regions or separations between core layers to form branched paths within core 16. In the example of FIG. 1, first header 12, core 16, and second header 14 are also shown to be oriented substantially in a straight line along an axis that extends perpendicularly from horizontal plane H (horizontal plane H is utilized herein as a representative plane that is parallel to sides of heat exchanger 10 corresponding to first fluid port 13 and second fluid port 15).

Though the example of FIG. 1 illustrates heat exchanger 10 as including a single first header 12 and a single second header 14 connected to core 16, it should be understood that in other examples, heat exchanger 10 can include more than two header structures interfacing with core 16. Multiple header structures can be arranged in a substantially similar manner to first header 12 and second header 14 and can form additional layers of an interface with core 16. First header 12 and second header 14 can be configured to connect to core 16 such that first header 12 and second header 14 are coplanar. However, it should be understood that other embodiments can include first header 12 and second header 14 (and additional headers not shown in FIG. 1) oriented along different planes with respect to each other.

Primary horn 18 is integrally formed with second header 14, as is further described below. Primary horn 18 extends centrally from second header 14 and has a generally columnar shape. Based on the orientation of second header 14 with respect to horizontal plane H, primary horn 18 can be perpendicular or approximately perpendicular to horizontal plane H. Secondary horns 20 are integrally formed with and extend from second header 14 at locations distal to primary horn 18, as is further described below. Secondary horns 20 are shaped similarly to primary horn 18 and also have generally columnar structures. Sacrificial support structure 22 connects primary horn 18 to each of secondary horns 20. Sacrificial support structure 22 can be integrally formed with each of primary horn 18 and secondary horns 20. Though the example of FIG. 1 shows a single primary horn 18 extending from second header 14, it should be understood that other examples can include additional primary horns 18 extending in a substantially similar manner from second header 14 and forming additional connections to sacrificial support structure 22.

During operation, heat exchanger 10 is configured to permit the transfer of heat between first fluid $F_1$ and the second fluid (not shown). For example, a transfer of heat can be associated with the use of first fluid $F_1$ and/or the second fluid for cooling and/or lubrication of components in a larger system, such as a gas turbine engine or aerospace system. First fluid $F_1$ and the second fluid can be any type of fluid, including air, water, lubricant, fuel, or another fluid. Heat exchanger 10 is described herein as providing heat transfer from first fluid $F_1$ to the second fluid; therefore, first fluid $F_1$ is at a greater temperature than the second fluid at the point where first fluid $F_1$ enters heat exchanger 10 (i.e., first fluid $F_1$ is a "hot" fluid and the second fluid is a "cold" fluid). However, other configurations of heat exchanger 10 can include the second fluid at a greater temperature than first fluid $F_1$ (and, thus, the second fluid would be the "hot" fluid and first fluid $F_1$ would be the "cold" fluid).

In the example of FIG. 1, first fluid $F_1$ is shown entering heat exchanger 10 at second fluid port 15. In another example, the direction of flow of first fluid $F_1$ can be reversed such that first fluid $F_1$ exits heat exchanger 10 at second fluid port 15 (and instead enters heat exchanger 10 at first fluid port 13). Thus, first fluid port 13 and second fluid port 15 can be configured alternately to receive or discharge first fluid $F_1$ (i.e., first header 12 and second header 14 can be configured alternately as inlet or outlet headers). Furthermore, heat exchanger 10 can be arranged to receive the second fluid at core 16 externally to heat exchanger 10 and in an opposite flow direction compared to first fluid $F_1$ (i.e., a counter-flow arrangement). The path of first fluid $F_1$ within heat exchanger 10 will be discussed in greater detail below with respect to FIGS. 2 and 3.

Heat exchanger 10 (and/or any component parts, including first header 12, second header 14, and core 16) can be formed partially or entirely by additive manufacturing. For metal components (e.g., nickel-based superalloys, aluminum, titanium, etc.) exemplary additive manufacturing processes include laser-powder bed fusion (L-PBF) techniques such as direct metal laser sintering (DMLS), laser net shape manufacturing (LNSM), electron beam manufacturing (EBM), to name a few, non-limiting examples. For polymer or plastic components, stereolithography (SLA) can be used. Additive manufacturing is particularly useful in obtaining unique geometries and for reducing the need for welds or other attachments (e.g., between a header and core). However, it should be understood that other suitable manufacturing processes can be used.

During an additive manufacturing process, heat exchanger 10 (and/or any component parts, including first header 12, second header 14, and core 16) can be formed layer by layer to achieve varied tubular dimensions (e.g., cross-sectional area, wall thicknesses, curvature, etc.). Each additively manufactured layer creates a new horizontal build plane (e.g., parallel to horizontal plane H) to which a subsequent layer of heat exchanger 10 is fused. That is, the build plane for the additive manufacturing process remains horizontal but shifts vertically by defined increments (e.g., one micrometer, one hundredth of a millimeter, one tenth of a millimeter, a millimeter, or other distances) as manufacturing proceeds. The example of FIG. 1 shows heat exchanger 10 already fully manufactured. Due to geometrical constraints, heat exchanger 10 is additively manufactured in the near vertical orientation, with respect to horizontal plane H, which is depicted in FIG. 1.

Figure 2:
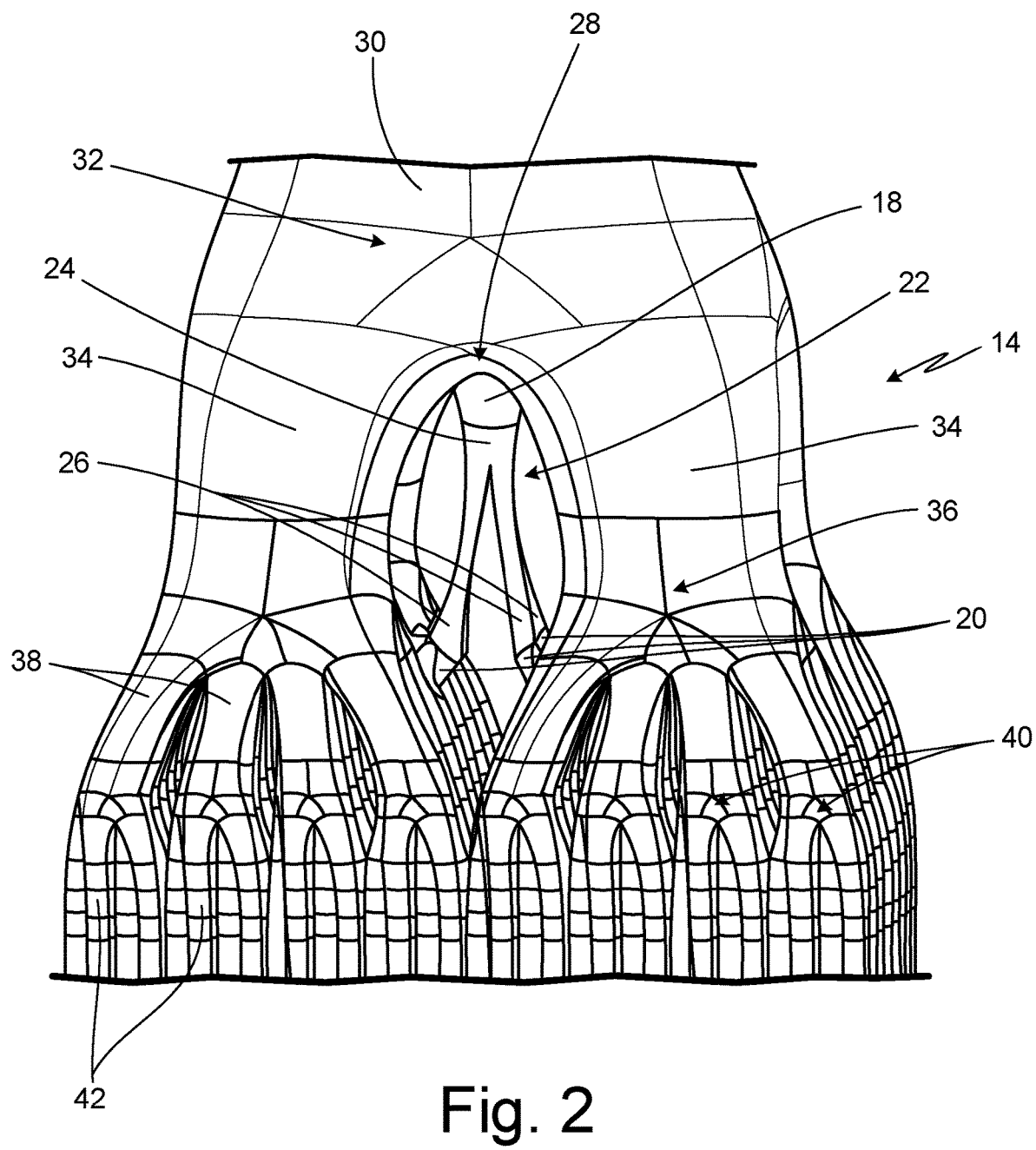
FIG. 2 is an isometric view of a heat exchanger header showing integrated horns and a sacrificial support structure.
Figure 3:
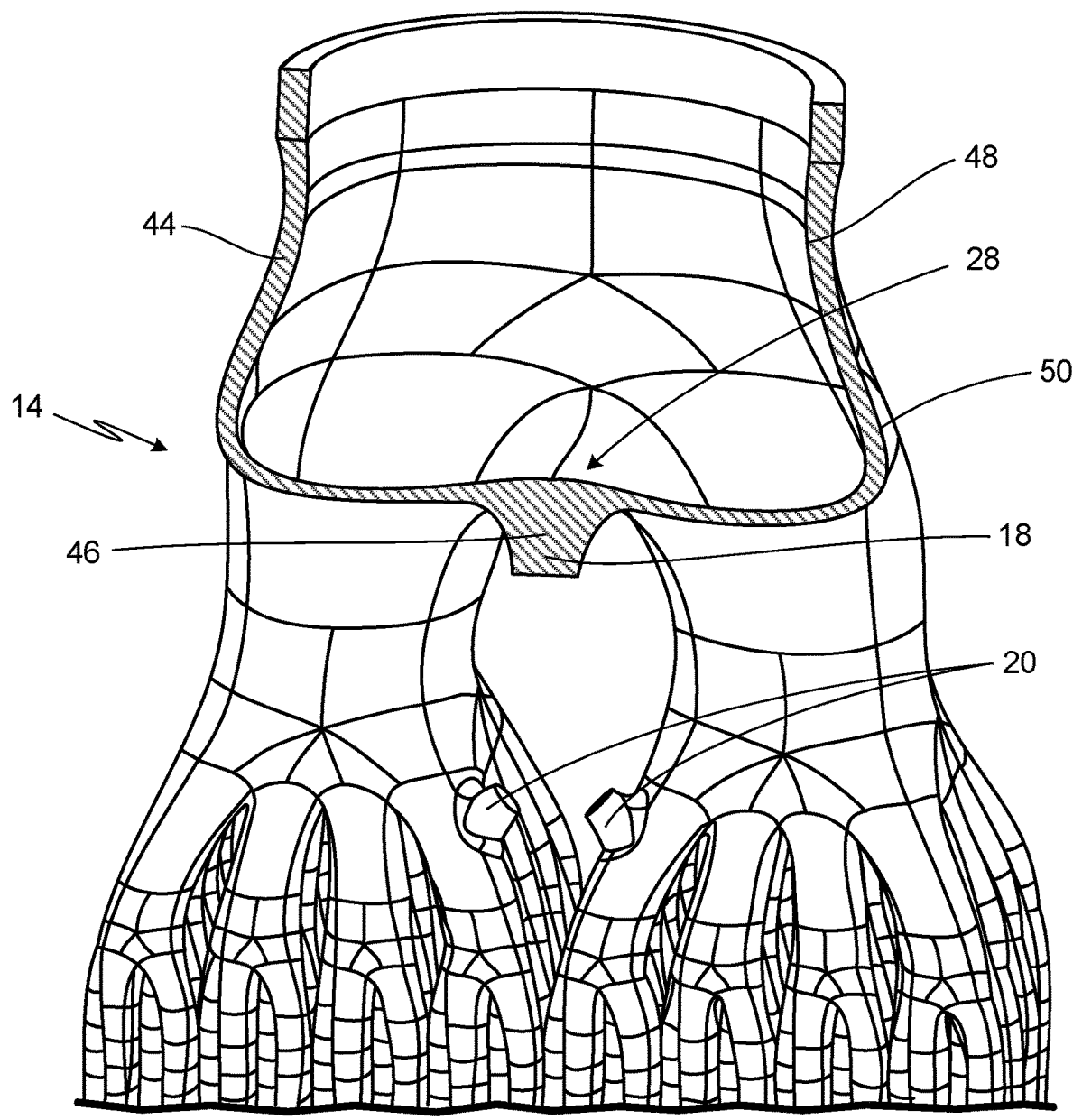
FIG. 3 is partially cut-away isometric view of a heat exchanger header showing varying wall thickness.

Primary horn 18 and secondary horns 20 are additively manufactured along with heat exchanger 10 such that each of primary horn 18 and secondary horns 20 is integrally formed with the walls of second header 14. During an additive manufacturing process, primary horn 18 and secondary horns 20, in conjunction with sacrificial support structure 22, function to support overhanging regions (e.g., overhang region 28 as shown in FIGS. 2 and 3) of the structure of second header 14.

Once heat exchanger 10 has been manufactured, primary horn 18 and secondary horns 20 remain as part of the structure of heat exchanger 10 during operation. Sacrificial support structure 22 is configured to be removed from heat exchanger 10 during a post-manufacture machining process, such as wire-electrical discharge machining (wire-EDM) or milling. Thus, it is critical to the operation of the component that sacrificial support structure 22 does not remain as part of the structure of heat exchanger 10 during operation.

In general, the branching structure of heat exchanger 10 retains the benefits of fractal geometry compared to traditional heat exchanger header configurations. Traditional heat exchanger headers, such as those with box-shaped manifolds, can have increased stress concentration at the interface between the manifold and the core, particularly at corners of the manifold where there is geometry discontinuity. The branching pattern of fractal heat exchanger headers, wherein each fluid duct is individually and directly connected to a passage in the core, as shown in FIG. 1, can reduce this geometry discontinuity. Furthermore, each fluid duct in a fractal heat exchanger header (e.g., first header 12 and second header 14) behaves like a slim beam with low stiffness in transverse directions and reduced stiffness in horizontal directions due to the curved shape at each branched region. Thus, first header 12 and second header 14 have increased compliance (i.e., reduced stiffness) and experience less thermal stress compared to traditional heat exchanger header configurations.

Furthermore, the addition of primary horn 18, secondary horns 20, and sacrificial support structure 22 enables heat exchanger 10 to be manufactured in the near vertical orientation that is required for powder bed fusion techniques of additive manufacturing. During a powder bed fusion process, it is ideal to print (i.e., weld or sinter) a new layer of an object directly on top of a previously printed layer, so that the previously printed layer can serve as a heat sink during printing of the new layer.

In any orientation, heat exchanger 10 can have overhanging regions (e.g., overhang region 28 between secondary fluid ducts 34 of second header 14 as shown in FIGS. 2 and 3), which are not—by themselves—adequately supported by a previously printed layer of heat exchanger 10. Designing the branching regions of a heat exchanger header to instead have a sharper intersection (which can be visualized simplistically as an upside-down "V") would change the construction so that subsequent layers would be built on top of a previous layer, but would also introduce high stress concentration at the sharp corner during operation of the heat exchanger. As such, it is beneficial to use a larger radius blend (which can be visualized simplistically as an upside-down "U," as illustrated in FIGS. 2 and 3 by overhang region 28), though this results in the less-printable overhang regions described above. Building these overhang regions can be difficult and costly because such a build would require very tight control over laser process parameters (e.g., with closed-loop feedback mechanisms or other process monitoring techniques).

The addition of primary horn 18, secondary horns 20, and sacrificial support structure 22 resolves these issues of printability and process efficiency associated with the additive manufacturing of heat exchanger 10. Because primary horn 18 extends approximately vertically from a central region of second header 14 (e.g., overhang region 28 in FIGS. 2 and 3) in the orientation for manufacturing illustrated in FIG. 1, there is no longer a significant overhanging region of second header 14 that is unsupported by previously manufactured layers. In other words, when heat exchanger 10 is additively manufactured in the direction from first header 12 to second header 14, the combination of primary horn 18, secondary horns 20, and sacrificial support structure 22 is manufactured layer-by-layer along with the rest of heat exchanger 10 such that a final layer printed in the region corresponding to primary horn 18 will be directly underlying a first layer printed in the otherwise overhanging region of second header 14 (e.g., overhang region 28 in FIGS. 2 and 3). The connection of primary horn 18 to secondary horns 20 via sacrificial support structure 22 provides similar support during additive manufacturing for primary horn 18.

Thus, heat exchanger 10 can be additively manufactured as a single, monolithic unit. Accordingly, the techniques of this disclosure allow for heat exchanger 10 to have increased efficiency and to be manufactured more effectively compared to traditional heat exchanger configurations.

For purposes of clarity and ease of discussion, FIGS. 2 and 3 will be described together. FIG. 2 is a partially cut-away isometric view of second header 14 of heat exchanger 10 showing a more detailed view of the integrated horns (e.g., primary horn 18 and secondary horns 20) and sacrificial support structure 22. FIG. 3 is partially cut-away isometric view of second header 14 showing varying wall thickness.

Second header 14 includes primary horn 18, secondary horns 20, and sacrificial support structure 22 (not shown in FIG. 3). Sacrificial support structure 22 includes trunk 24 and limbs 26. Second header 14 additionally includes overhang region 28 of primary fluid duct 30, first branched region 32, secondary fluid ducts 34, second branched regions 36, tertiary fluid ducts 38, third branched regions 40, and quaternary fluid ducts 42. As shown in FIG. 3, second header 14 is defined by thin walls 44, thick walls 46, interior surface 48, and exterior surface 50.

Primary fluid duct 30 forms a first section of second header 14. Primary fluid duct 30 extends between second fluid port 15 (FIG. 1) and first branched region 32. First branched region 32 forms an end of primary fluid duct 30 distal to second fluid port 15.

Secondary fluid ducts 34 are fluidly connected to primary fluid duct 30 at first branched region 32. Though the examples of FIGS. 2 and 3 show first branched region 32 branching into four secondary fluid ducts 34, it should be understood that in other examples, alternate configurations are possible, including more or fewer secondary fluid ducts 34 extending from first branched region 32.

Each secondary fluid duct 34 extends between first branched region 32 and second branched regions 36. Each secondary fluid duct 34 can form a relatively straight path between first branched region 32 and second branched regions 36. At second branched regions 36, each secondary fluid duct is fluidly connected to tertiary fluid ducts 38. Though the examples of FIGS. 2 and 3 show second branched regions 36 branching into sixteen tertiary fluid ducts 38, it should be understood that in other examples, alternate configurations are possible, including more or fewer tertiary fluid ducts 38 extending from each second branched region 36. In some examples, second header 14 can have a fractal geometry defining the branching relationship between secondary fluid ducts 34 and tertiary fluid ducts 38, such that the number of tertiary fluid ducts 38 extending from each second branched region 36 is equal to the total number of secondary fluid ducts 34. In yet other examples, the number of tertiary fluid ducts 38 extending from different second branched regions 36 can be varied throughout second header 14.

Third branched regions 40 form ends of tertiary fluid ducts 38 distal to second branched regions 36. Quaternary fluid ducts 42 are fluidly connected to tertiary fluid ducts 38 at third branched regions 40. Each quaternary fluid duct 42 extends between one of third branched regions 40 and core 16 (FIG. 1). Each quaternary fluid duct 42 can form a relatively straight path between third branched regions 40 and core 16. Additionally, each of quaternary fluid ducts 42 can form an individual connection with a tube of core 16 (not shown). Though the examples of FIGS. 2 and 3 show third branched regions 40 branching into four quaternary fluid ducts 42, it should be understood that in other examples, alternate configurations are possible, including more or fewer quaternary fluid ducts 42 extending from third branched regions 40. In some examples, second header 14 can have a fractal geometry defining the branching relationship between tertiary fluid ducts 38 and quaternary fluid ducts 42, such that the number of quaternary fluid ducts 42 extending from each third branched region 40 is equal to the total number of tertiary fluid ducts 38. In yet other examples, the number of quaternary fluid ducts 42 extending from different third branched regions 40 can be varied throughout second header 14, or there can be additional levels of branching between third branched regions 40 and core 16.

Overhang region 28 defines the structural region of second header 14 that spans centrally between adjacent ones of secondary fluid ducts 34. Secondary fluid ducts 34 are separated such that an open space is formed within the branching structure of second header 14. Primary horn 18 is integrally formed with and extends from overhang region 28 into the open space. At least one secondary horn 20 can be integrally formed with and extend from at least one of tertiary fluid ducts 38 into the open space. In the example of FIG. 2, a single secondary horn 20 extends from a single tertiary fluid duct 38 per each of the four second branched regions 36, such that there are four secondary horns 20. The particular tertiary fluid duct 38 from which one secondary horn 20 extends can be one of tertiary fluid ducts 38 that is disposed along the central open space formed within second header 14. It should also be understood that in other examples, alternate configurations are possible, including more or fewer secondary horns 20 extending from individual tertiary fluid ducts 38.

As described above with respect to FIG. 1, primary horn 18 has a generally columnar shape. Primary horn 18 connects to trunk 24 of sacrificial support structure 22. Trunk 24 branches into limbs 26. Each of limbs 26 of sacrificial support structure 22 connects to one of secondary horns 20, such that the number of limbs 26 can be equal to the number of secondary horns 20. In the example of FIG. 2, there are four secondary horns 20, so trunk 24 branches into four corresponding limbs 26. The entirety of sacrificial support structure 22 can be situated within the open space formed within the branching structure of second header 14.

As is best shown in FIG. 3, the tubular structures of second header 14 (e.g., primary fluid duct 30, secondary fluid ducts 34, tertiary fluid ducts 38, and quaternary fluid ducts 42 as shown in FIG. 2) are formed of thin walls 44. Interior surface 48 defines an interior cavity of second header 14. Exterior surface 50 defines an exterior of second header 14. The distance between interior surface 48 and exterior surface 50 can be relatively small (e.g., one tenth of a millimeter, a millimeter, or other distances) along thin walls 44 because the overall three-dimensional structure of second header 14 is hollow (i.e., tubular) in these regions.

Primary horn 18 and secondary horns 20, by contrast, are defined by thick walls 46. As shown in the example of FIG. 3, the three-dimensional structure of primary horn 18 is not tubular or hollow but instead is solid. Therefore, the distance between interior surface 48 and exterior surface 50 can be greater at thick walls 46 than the distance between interior surface 48 and exterior surface 50 at thin walls 44. In other words, thick walls 46 can have a greater width than thin walls 44.

With continued reference to FIGS. 2 and 3, first fluid $F_1$ entering second header 14 at second fluid port 15 (FIG. 1) is channeled through primary fluid duct 30 to first branched region 32. At first branched region 32, first fluid $F_1$ flows into secondary fluid ducts 34. First fluid $F_1$ flows within secondary fluid ducts 34 to reach second branched regions 36. At each second branched region 36, first fluid $F_1$ is channeled out from one secondary fluid duct 34 and into tertiary fluid ducts 38. First fluid $F_1$ flows within tertiary fluid ducts 38 to reach third branched regions 40. At each third branched region 40, first fluid $F_1$ is channeled out from one tertiary fluid duct 38 and into quaternary fluid ducts 42.

In the examples of FIGS. 2 and 3, first fluid $F_1$ flows directly from quaternary fluid ducts 42 into core 16 (FIG. 1). In alternative embodiments, second header 14 can be configured to include additional levels of branching and intervening fluid ducts fluidly connected downstream of quaternary fluid ducts 42 and upstream of core 16. Heat transfer between first fluid $F_1$ and the second fluid (not shown) can occur largely at core 16 of heat exchanger 10.

Primary horn 18 and secondary horns 20 extend away from overhang region 28 and tertiary fluid ducts 38, respectively, such that sacrificial support structure 22 is not connected directly to any of thin walls 44. Thus, thick walls 46 (e.g., at primary horn 18 and secondary horns 20) serve as regions where sacrificial support structure 22 can be machined away or even broken away (i.e., sacrificial support structure 22 can be machinable or frangible) from the remaining structure of heat exchanger 10.

In addition to the benefits of heat exchanger 10 as described above with reference to FIG. 1, sacrificial support structure 22 can be machined away from heat exchanger 10 in a single post-manufacture machining process. Integrated supports to be left in place during operation of a heat exchanger are not desirable because these impart large stress concentrations due to high thermal growth during operation of the heat exchanger. A permanent connection between parts of a heat exchanger would prevent the heat exchanger from expanding (e.g., thermal expansion caused by contact with hot first fluid $F_1$), resulting in increased stress concentrations. Furthermore, a heat exchanger manufactured with sacrificial supports that are connected directly to the structure of the heat exchanger (e.g., if sacrificial support structure 22 was instead connected directly to thin walls 44) is not desirable because removing the sacrificial support could cause damage to the relatively fragile heat exchanger structure.

The solid structure and thick walls 46 of primary horn 18 and secondary horns 20 to which sacrificial support structure 22 is connected prevent damage to thin walls 44 because any machining or breakage to remove sacrificial support structure 22 will occur at thick walls 46 rather than thin walls 44. Thus, thick walls 46 can serve as a buffer between the relatively fragile structure of heat exchanger 10 and any disturbances caused by post-manufacture machining or breakaway processes.

Furthermore, because primary horn 18, secondary horns 20, and sacrificial support structure 22 all extend into the same open space within second header 14 such that all are visible from one line of sight through heat exchanger 10, the connections of trunk 24 and limbs 26 of sacrificial support structure 22 are easily accessible by any machining equipment which may be used, such as in a wire-electrical discharge machining (wire-EDM) process. Thus, rather than requiring multiple steps, sacrificial support structure 22 can be machined away in single post-manufacture process that cuts through each of its connections to primary horn 18 and secondary horns 20 (e.g., at trunk 24 and limbs 26) in sequence.

Because sacrificial support structure 22—which forms a connection between overhang region 28 and tertiary fluid ducts 38 of second header 14 and would prevent expansion of heat exchanger 10 during operation—can be removed prior to operation of heat exchanger 10, the remaining unconnected primary horn 18 and secondary horns 20 do not impart significant stress concentrations. Accordingly, the techniques of this disclosure allow for heat exchanger 10 to have increased efficiency and to be manufactured more effectively compared to traditional heat exchanger configurations.

Discussion of Possible Embodiments

The following are non-exclusive descriptions of possible embodiments of the present invention.

A heat exchanger header includes a primary fluid duct extending between a fluid port and a first branched region, a plurality of secondary fluid ducts fluidly connected to the primary fluid duct at the first branched region, wherein the plurality of secondary fluid ducts extends from the first branched region such that an overhang region is formed laterally between adjacent ones of the plurality of secondary fluid ducts, and wherein each of the plurality of secondary fluid ducts extends between the first branched region and a second branched region, a plurality of tertiary fluid ducts fluidly connected to each of the plurality of secondary fluid ducts at the second branched regions, a primary horn integrally formed with and extending from the overhang region, an at least one secondary horn integrally formed with and extending from one of the plurality of tertiary fluid ducts, and a sacrificial support structure extending between the primary horn and the at least one secondary horn.

The heat exchanger header of the preceding paragraph can optionally include, additionally and/or alternatively, any one or more of the following features, configurations and/or additional components:

The primary, secondary, and tertiary fluid ducts can be tubular.

The header can have a fractal geometry.

The header can be configured to receive or discharge a first fluid and to interact with a second fluid in a counterflow arrangement.

The primary and secondary horns can be arranged such that all of the primary and secondary horns are visible from an at least one same line of sight through the header.

The header can be configured to be additively manufactured as a single, monolithic unit.

The header can be formed from a metallic material.

The sacrificial support structure can be configured to be removed from the primary and secondary horns during a single wire-electrical discharge machining (wire-EDM) process.

The heat exchanger header can further include a core, wherein the header is fluidly connected to the core distal to the fluid port.

A heat exchanger includes a first header, a second header, and a core extending between the first header and the second header such that the first header, the second header, and the core are fluidly connected. The second header includes a primary fluid duct extending between a fluid port and a first branched region, a plurality of secondary fluid ducts fluidly connected to the primary fluid duct at the first branched region, wherein the plurality of secondary fluid ducts extends from the first branched region such that an overhang region is formed laterally between adjacent ones of the plurality of secondary fluid ducts, and wherein each of the plurality of secondary fluid ducts extends between the first branched region and a second branched region, a plurality of tertiary fluid ducts fluidly connected to each of the plurality of secondary fluid ducts at the second branched regions, a primary horn integrally formed with and extending from the overhang region, an at least one secondary horn integrally formed with and extending from one of the plurality of tertiary fluid ducts, and a sacrificial support structure extending between the primary horn and the at least one secondary horn.

The heat exchanger of the preceding paragraph can optionally include, additionally and/or alternatively, any one or more of the following features, configurations and/or additional components:

The primary, secondary, and tertiary fluid ducts can be tubular.

The first and second headers can have a fractal geometry.

The heat exchanger can be configured to receive or discharge a first fluid and to interact with a second fluid in a counterflow arrangement.

The primary and secondary horns can be arranged such that all of the primary and secondary horns are visible from an at least one same line of sight through the second header.

The heat exchanger can be formed from a metallic material.

The sacrificial support structure can be configured to be removed from the primary and secondary horns during a single wire-electrical discharge machining (wire-EDM) process.

A method can include constructing the heat exchanger utilizing an additive manufacturing process, wherein the heat exchanger is configured to be additively manufactured as a single, monolithic unit.

The heat exchanger can be oriented such that the second header is an uppermost header during the additive manufacturing process and the overhang region is substantially parallel to a horizontal build plane.

The additive manufacturing process can be a laser-powder bed fusion (L-PBF) process.

The method can further include removing at least a portion of the sacrificial support structure after the additive manufacturing process is completed utilizing a wire-electrical discharge machining (wire-EDM) process.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger header comprising:
   a primary fluid duct extending between a fluid port and a first branched region;
   a plurality of secondary fluid ducts fluidly connected to the primary fluid duct at the first branched region, wherein the plurality of secondary fluid ducts extends from the first branched region such that an overhang region is formed laterally between adjacent ones of the plurality of secondary fluid ducts, and wherein each of the plurality of secondary fluid ducts extends between the first branched region and a second branched region;
   a plurality of tertiary fluid ducts fluidly connected to each of the plurality of secondary fluid ducts at the second branched regions; a primary horn integrally formed with and extending from the overhang region;
   an at least one secondary horn integrally formed with and extending from one of the plurality of tertiary fluid ducts; and
   a sacrificial support extending from the primary horn to the at least one secondary horn and configured to provide support for the overhang region during additive manufacturing of the heat exchanger header, the sacrificial support comprising:
   a trunk portion connected to the primary horn; and
   limbs that branch from the trunk portion and connect to the at least one secondary horn.

2. The heat exchanger header of claim 1,
wherein the header has a fractal geometry.

3. The heat exchanger header of claim 1,
wherein the primary, secondary, and tertiary fluid ducts are tubular and hollow; and
wherein the primary horn and the at least one secondary horn are solid.

4. The heat exchanger header of claim 3, wherein the header further includes:
an interior surface that defines an interior cavity of the header; and
an exterior surface; and
wherein a distance between the interior surface and the exterior surface is greater at the primary and secondary horns than at the primary, secondary, and tertiary fluid ducts, such that the primary and secondary horns are formed of relatively thick walls and the primary, secondary, and tertiary fluid ducts are formed of relatively thin walls.

5. The heat exchanger header of claim 1, wherein the header has walls with varying thickness such that the primary and secondary horns are formed of relatively thick walls and the primary, secondary, and tertiary fluid ducts are formed of relatively thin walls.

6. The heat exchanger header of claim 1,
wherein the primary and secondary horns are arranged such that all of the primary and secondary horns are visible from an at least one same line of sight through the header.

7. The heat exchanger header of claim 6,
wherein the header is configured to be additively manufactured as a single, monolithic unit.

8. The heat exchanger header of claim 7,
wherein the header is formed from a metallic material; and
wherein the sacrificial support is configured to be removed from the primary and secondary horns during a single wire-electrical discharge machining (wire-EDM) process.

9. A heat exchanger comprising:
a first header;
a second header comprising:
a primary fluid duct extending between a fluid port and a first branched region; a plurality of secondary fluid ducts fluidly connected to the primary fluid duct at the first branched region, wherein the plurality of secondary fluid ducts extends from the first branched region such that an overhang region is formed laterally between adjacent ones of the plurality of secondary fluid ducts, and wherein each of the plurality of secondary fluid ducts extends between the first branched region and a second branched region;
a plurality of tertiary fluid ducts fluidly connected to each of the plurality of secondary fluid ducts at the second branched regions;
a columnar primary horn integrally formed with and extending from the overhang region;
an at least one secondary horn integrally formed with and extending from one of the plurality of tertiary fluid ducts; and
a sacrificial support extending from the columnar primary horn to the at least one secondary horn to provide support for the overhang region during additive manufacturing of the second header; and
a core extending between the first header and the second header such that the first header, the second header, and the core are fluidly connected.

10. The heat exchanger of claim 9,
wherein the first and second headers have a fractal geometry.

11. The heat exchanger of claim 9,
wherein the primary, secondary, and tertiary fluid ducts are tubular and hollow; and
wherein the columnar primary horn and the at least one secondary horn are solid.

12. The heat exchanger of claim 9, wherein the second header has walls with varying thickness such that the primary and secondary horns are formed of relatively thick walls and the primary, secondary, and tertiary fluid ducts are formed of relatively thin walls.

13. The heat exchanger of claim 9,
wherein the primary and secondary horns are arranged such that all of the primary and secondary horns are visible from an at least one same line of sight through the second header.

14. The heat exchanger header of claim 13,
wherein the heat exchanger is formed from a metallic material.

15. The heat exchanger header of claim 14,
wherein the sacrificial support is configured to be removed from the primary and secondary horns during a single wire-electrical discharge machining (wire-EDM) process.

16. A method comprising:
constructing the heat exchanger of claim 9 utilizing an additive manufacturing process;
wherein the heat exchanger is configured to be additively manufactured as a single, monolithic unit.

17. The method of claim 16,
wherein the heat exchanger is oriented such that the second header is an uppermost header during the additive manufacturing process and the overhang region is substantially parallel to a horizontal build plane.

18. The method of claim 16,
wherein the additive manufacturing process is a laser-powder bed fusion (L-PBF) process.

19. The method of claim 16, further comprising:
removing at least a portion of the sacrificial support after the additive manufacturing process is completed utilizing a wire-electrical discharge machining (wire-EDM) process.

20. A method comprising:
constructing a heat exchanger header by an additive manufacturing process, the header comprising:
a plurality of fluid ducts arranged in a branching structure such that an open space is formed within the branching structure;
an overhang region spanning laterally between adjacent ones of the plurality of fluid ducts; and
a sacrificial support extending within the open space and configured to provide support for the overhang region during the additive manufacturing process;
wherein the header has walls with varying thickness, the sacrificial support being connected to portions formed of relatively thick walls, and the plurality of fluid ducts being formed of relatively thin walls;
machining away the sacrificial support at the relatively thick walls of the header; and
removing at least a portion of the sacrificial support after the additive manufacturing process is completed.

* * * * *